No. 786,145. PATENTED MAR. 28, 1905.
J. W. PARSONS.
STEEL TRAP.
APPLICATION FILED JUNE 20, 1904.

3 SHEETS—SHEET 1.

Witnesses

Inventor
J. W. Parsons
By
Chandler & Chandler
Attorneys

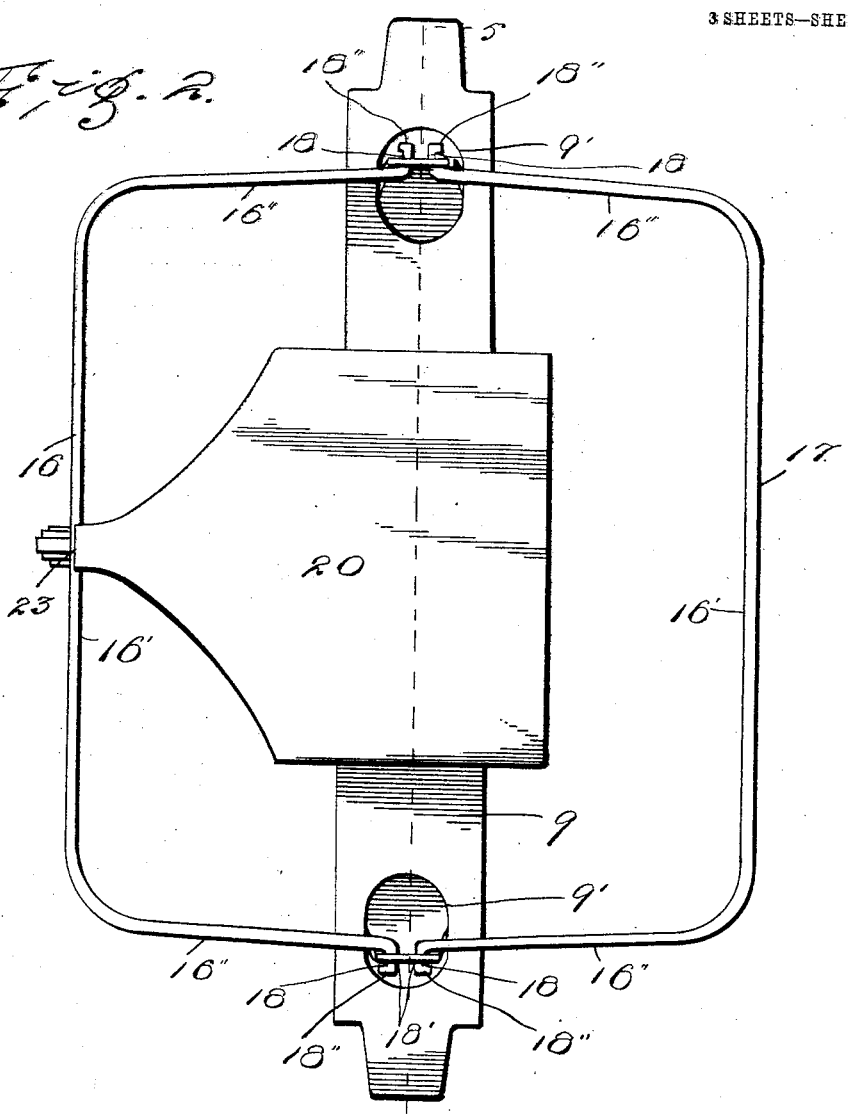
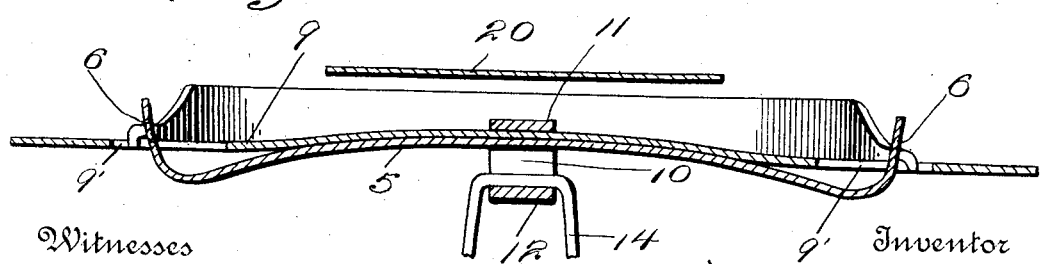

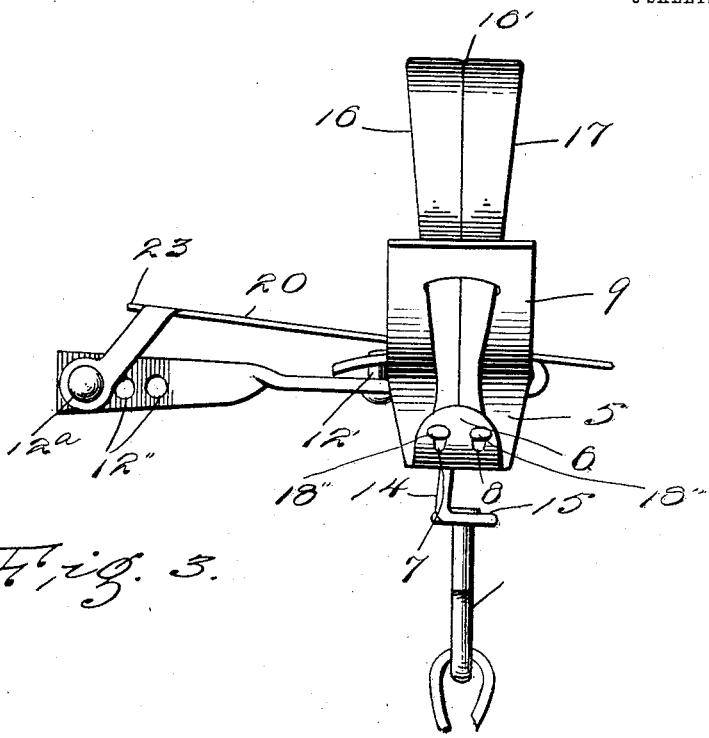
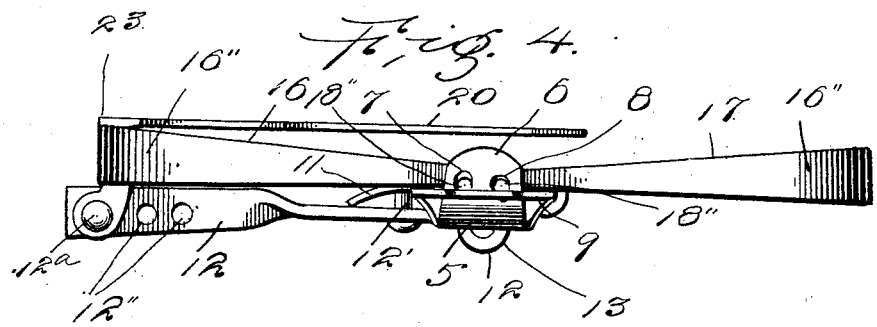

No. 786,145.	Patented March 28, 1905.

UNITED STATES PATENT OFFICE.

JAMES W. PARSONS, OF SLATER, COLORADO.

STEEL TRAP.

SPECIFICATION forming part of Letters Patent No. 786,145, dated March 28, 1905.

Application filed June 20, 1904. Serial No. 213,390.

*To all whom it may concern:*

Be it known that I, JAMES W. PARSONS, a citizen of the United States, residing at Slater, in the county of Routt, State of Colorado, have invented certain new and useful Improvements in Steel Traps; and I do hereby declare the following to be a full, clear, and exact description of the invention, such as will enable others skilled in the art to which it appertains to make and use the same.

This invention relates to traps, and more particularly to the class known as "steel" traps, and has for its object to provide a device of this nature which will be simple of construction and cheap of manufacture, which will consist of but few parts, and which will be so constructed that it will be impossible for an animal caught in the trap to displace the parts thereof in its efforts to free itself.

Figure 1:
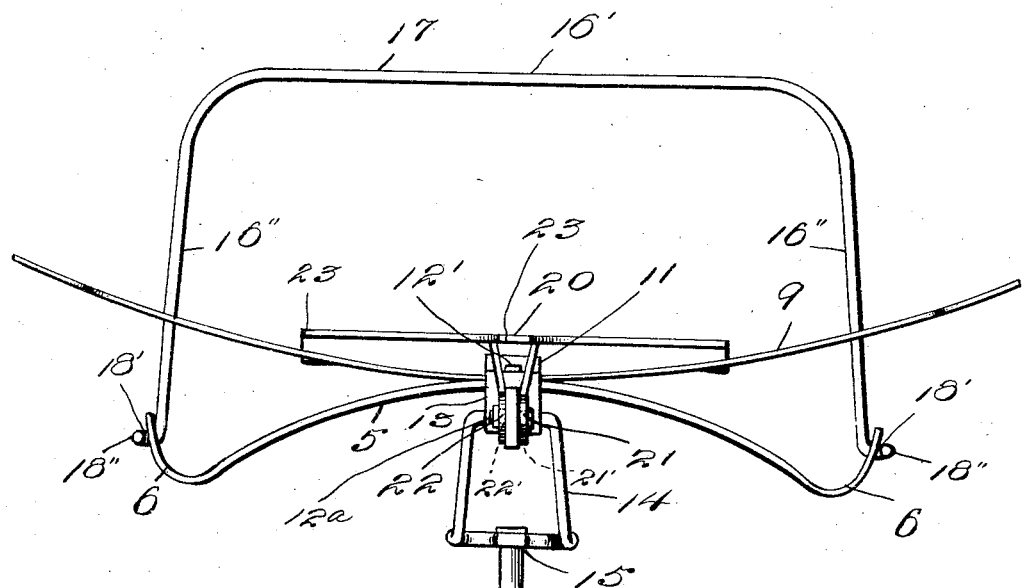
Figure 7:
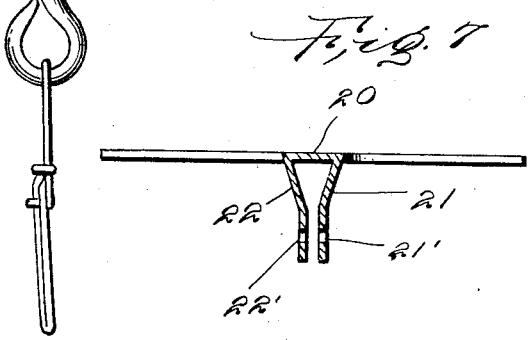
Figure 6:
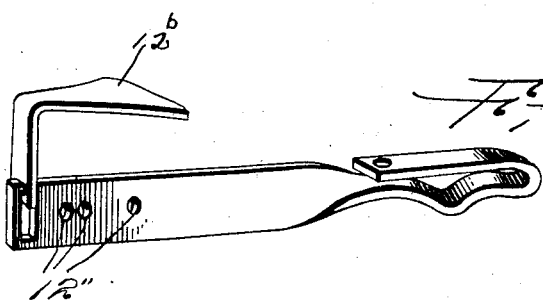

In the drawings forming a portion of this specification, and in which like numerals of reference indicate similar parts in the several views, Figure 1 is a side elevation of the trap closed. Fig. 2 is a top plan view of the trap open. Fig. 3 is an end view of Fig. 1. Fig. 4 is an end view of Fig. 2. Fig. 5 is a section on line 5 5 of Fig. 2. Fig. 6 is a detail view of the loop and illustrating a modification employing a retaining-dog for the jaws. Fig. 7 is a detail sectional view taken through the legs of the trip-plate.

Referring now to the drawings, there is shown an arc-shaped spring-plate 5, the ends 6 of which are turned upwardly away from the convex face thereof and are each provided with a pair of longitudinally-disposed keyhole-slots 7 and 8, the minor portions of which extend downwardly. Disposed upon the upper face of the plate 5 is a second arc-shaped spring-plate 9, having openings 9' in its ends, which are of a size to receive the ends 6 of the plate 5 therethrough. The two plates are secured together by means of a loop 10, which is engaged therewith, the spaced portions 11 and 12 of the loop lying against the upper face of the plate 9 and the lower face of the plate 5, respectively. The portion 12 of the loop has a transverse convolution 13 therein, with which is engaged a ring 14, having a swivel 15 connected therewith, to which there is connected a chain by which the trap may be secured. The portions 11 and 12 extend beyond the plates 5 and 9 at one side and are secured together by a bolt 12', passed through perforations therein. The portion 12 is considerably longer than the portion 11 and is given a half-turn beyond the end thereof, so that what was formerly its lateral dimension is now its vertical dimension. The outer end of the portion 12 is provided with a series of perforations 12'', with one of which is engaged a bolt 12ª, and pivotally engaged with the ends of this bolt are the perforations 22' and 21' of legs 22 and 21, which depend from a trip-plate 20. The plate 20 and the depending legs are in manufacture stamped from a single piece of metal and the legs are afterward bent at right angles to the plate.

Jaws 16 and 17 are provided for the trap, each including a biting portion 16', having angular end portions 16'', the extremities of which are turned outwardly and have notches 18 filed or otherwise formed therein, resulting in stems 18', having lateral heads 18'' at their outer ends.

In assembling the parts of the trap the plates 9 and 5 are brought together to cause the ends 6 to project through the openings 9', in which position they are held by clamps or in any desired manner. The angular portions 16'' of the jaws are now sprung together and the lateral heads 18'' are passed through the keyhole-slots 7 and 8, it being understood that the slots 7 aline with each other and that the slots 8 aline also. If the holding means be now released from the plates 5 and 9, these plates will spring apart and will cause the biting portions 16' of the jaws to come together, turning the heads 18'' transversely of the slots 6 and 7. It will thus be apparent that if an animal should be caught in the trap these heads would prevent it from pulling the ends 18 from the slots in its efforts to free itself.

In setting the trap the ends of the plate 9 are forced downwardly, which may be done by pressing thereon with the feet, and when the plate has been depressed sufficiently the jaws are separated and one of them is engaged beneath a rearwardly-extending finger 23 upon the trip-plate 20, which holds the jaws against the action of the plate 9. Any pressure upon the plate 20 of course releases the jaws.

The bolt $12^a$ is arranged for interchangeable engagement with the perforations $12''$, so that the trip-plate may be moved toward and away from the jaw with which the finger 23 is engaged, and if the jaw becomes bent or the finger 23 becomes worn, so that the finger will not readily engage the jaw, the plate may be moved to bring the finger into the desired position.

In Fig. 6 there is shown a modification in which the perforations $12''$ are arranged in a different form and in which a dog $12^b$ is employed to retain the jaws in open position, the dog being engaged by the trip-plate, as will be readily understood.

What is claimed is—

1. A trap comprising a plate having upwardly-turned ends provided with keyhole-slots, jaws having their extremities engaged with the slots and having heads upon their ends, said heads being of a size to pass through the slots, said heads lying transversely of the slots when the jaws are in operative position, means for holding the jaws yieldably in operative position, and means for holding the jaws against the action of the first-named holding means.

2. A trap comprising a plate, a spring-plate disposed upon the first-named plate and having openings in its ends, a loop engaged with the two plates and extending beyond one side thereof, the lower portion of the loop having a chain engaged therewith, the upper and lower portions of the loop being connected beyond the plates, jaws pivotally connected with the ends of the first-named plate and engaged with the openings of the second-named plate, said second-named plate being arranged for movement to disengage its openings from the jaws to permit of separation thereof, and a trip-plate pivoted to the loop and having a finger for engagement with one of the jaws to hold the jaws separated.

3. A trap comprising coöperating jaws for movement into inoperative and operative positions, means for moving the jaws into their operative positions and for holding them in such positions, a pivotally-mounted plate having a finger arranged for engagement with one of the jaws to hold it in inoperative position, said plate being adjustable toward and away from the jaw.

In testimony whereof I affix my signature in presence of two witnesses.

JAMES W. PARSONS.

Witnesses:
 DANIEL C. PATTON,
 GUY V. SPARLIN.